US009731263B2

(12) United States Patent
Blosi et al.

(10) Patent No.: US 9,731,263 B2
(45) Date of Patent: Aug. 15, 2017

(54) PROCESS FOR PREPARING STABLE SUSPENSIONS OF METAL NANOPARTICLES AND THE STABLE COLLOIDAL SUSPENSIONS OBTAINED THEREBY

(75) Inventors: Magda Blosi, Russi (IT); Stefania Albonetti, Imola (IT); Michele Dondi, Bologna (IT); Giovanni Baldi, Montespertoli (IT); Andrea Barzanti, Montelupo Fiorentino (IT); Marco Bitossi, Motelupo Fiorentino (IT)

(73) Assignee: COLOROBBIA ITALIA S.P.A., Sovigliana Vinci (IT)

( * ) Notice: Subject to any disclaimer, the term of this patent is extended or adjusted under 35 U.S.C. 154(b) by 774 days.

(21) Appl. No.: 13/203,948

(22) PCT Filed: Mar. 1, 2010

(86) PCT No.: PCT/EP2010/052534
§ 371 (c)(1),
(2), (4) Date: Aug. 30, 2011

(87) PCT Pub. No.: WO2010/100107
PCT Pub. Date: Sep. 10, 2010

(65) Prior Publication Data

US 2011/0313059 A1 Dec. 22, 2011

(30) Foreign Application Priority Data

Mar. 2, 2009 (IT) ................................ FI2009A0034

(51) Int. Cl.
*B01J 13/00* (2006.01)
*B22F 1/00* (2006.01)
*B22F 9/24* (2006.01)
*B82Y 30/00* (2011.01)

(52) U.S. Cl.
CPC ......... *B01J 13/0043* (2013.01); *B22F 1/0022* (2013.01); *B22F 9/24* (2013.01); *B82Y 30/00* (2013.01); *B22F 2998/00* (2013.01)

(58) Field of Classification Search
CPC ....... B01J 13/0043; B22F 9/24; B22F 1/0022; B22F 2998/00
USPC ........... 516/97; 977/777, 783, 786; 252/513, 252/514
See application file for complete search history.

(56) References Cited

U.S. PATENT DOCUMENTS

| | | | | |
|---|---|---|---|---|
| 3,464,226 | A | 9/1969 | Kramer et al. | |
| 7,351,591 | B2 | 4/2008 | Koo et al. | 436/525 |
| 7,615,096 | B1 * | 11/2009 | Tai et al. | 75/333 |
| 2005/0189520 | A1 * | 9/2005 | Okada et al. | 252/500 |
| 2006/0090596 | A1 * | 5/2006 | Goia et al. | 75/371 |
| 2006/0090598 | A1 * | 5/2006 | Goia et al. | 75/371 |
| 2007/0034052 | A1 * | 2/2007 | Vanheusden et al. | 75/362 |
| 2007/0056402 | A1 * | 3/2007 | Cho et al. | 75/362 |
| 2007/0207335 | A1 * | 9/2007 | Karandikar et al. | 428/560 |
| 2008/0064767 | A1 * | 3/2008 | Chou et al. | 516/97 |

FOREIGN PATENT DOCUMENTS

| | | | |
|---|---|---|---|
| CN | 1806972 | | 7/2006 |
| DE | 202004004017 | U1 * | 9/2004 |
| JP | 2004346429 | A * | 12/2004 |
| KR | 20070083988 | A | 8/2007 |
| KR | 20080007310 | A | 1/2008 |
| SU | 1638163 | A1 * | 3/1991 |
| WO | 2006050248 | A2 | 5/2006 |
| WO | 2006072959 | A1 | 7/2006 |
| WO | WO 2007/065446 | A2 | 6/2007 |

OTHER PUBLICATIONS

Liu et al, "Rapid synthesis of nanoscaie colloidal metal clusters by microwave irradiation", Journal of Materials Chemistry, vol. 10, No. 9, (Jan. 2000), pp. 2207-2211.*

Pal et al, "Synthesis of Au, Ag and Au—Ag alloy nanoparticles in aqueous polymer solution", Colloids and Surfaces A: Physicochem. Eng. Aspects 302 (2007) 51-57 (available online Feb. 2007).*

He et al, "Synthesis of size controlled Ag nanoparticles", Journal of Molecular Catalysis A: Chemical 221 (2004) 121-126, (available online Aug. 2004).*

Wang et al, "Preparation of silver nanoparticles by chemical reduction method", Colloids and Surfaces A: Physicochem. Eng. Aspects 256 (2005) 111-115, (available online Jan. 2005).*

Singh et al., "Role of pH in the green synthesis of silver nanoparticles", Materials Letters 63 (2009) 425-427, (available online Nov. 2008).*

Singh et al, "Role of pH in the green synthesis of silver nanoparticles", Materials Letters 63 (2009) 425-427 (Available online Nov. 10, 2008).*

Machine Translation of Publ. No. DE202004004017 (W), published Dec. 2004, European patent Office, obtained online @ http://ep.espacenet.com/?locale=EN_ep (Downloaded Dec. 13, 2016), pp. 1-13.*

Machine Translation of Publ. No. JP 2004346429 A, published Sep. 2004, Japan patent Office, Tokyo, Japan, obtained online @ http://dossier1.ipdl.inpit.go.jp/AIPN/odse_top_dn.ipdl?N0000=7400 (Downloaded Dec. 13, 2016), pp. 1-23.*

Machine Translation of Publ. No. SU1638163 (A1), published Mar. 1991, European patent Office, obtained online @ http://ep.espacenet.com/?locale=EN_ep (Downloaded Dec. 12, 2016), pp. 1-6.*

(Continued)

*Primary Examiner* — Daniel S Metzmaier

(74) *Attorney, Agent, or Firm* — Ohlandt, Greeley, Ruggiero & Perle, LLP

(57) ABSTRACT

A process is described for preparing stable suspensions of metal nanoparticles by means of a microwave-assisted metal nanoparticle synthesis undertaken in an aqueous environment at low temperature and at ambient pressure and atmosphere.

16 Claims, 5 Drawing Sheets

(56) References Cited

OTHER PUBLICATIONS

International Search Report and Written Opinion from PCT/EP2010/052534 dated Sep. 22, 2010.

Tu, et al., "*Rapid synthesis of nanoscale colloidal metal clusters by microwave irradiation*"; Journal of Materials Chemistry, The Royal Society of Chemistry, Cambridge, GB, vol. 10, No. 9, Jan. 1, 2000, pp. 2207-2211.

Yu, et al., "*Synthesis of Nanoscale Platinum Colloids by Microwave Dielectric Heating*"; Langmuir 1999, vol. 15, Jan. 1, 1999, pp. 6-9.

Liu, et al., "*Rapid synthesis and morphology control of nickel powders via a microwave-assisted chemical reduction method*", Journal of Materials Science, vol. 44, No. 1, Dec. 5, 2008, pp. 108-113.

Yamamoto, et al., "*Morphology-control in Microwave-Assisted Synthesis of Silver Particles in Aqueous Solutions*", Bull. Chem. Soc. Jpn, vol. 77, No. 4, Apr. 2, 2004, pp. 757-761.

Liu, et al., "*Formation of silver nanorods by microwave heating in the presence of gold seeds*", Journal of Crystal Growth, vol. 273, No. 3-4, Jan. 3, 2005, pp. 439-445.

* cited by examiner

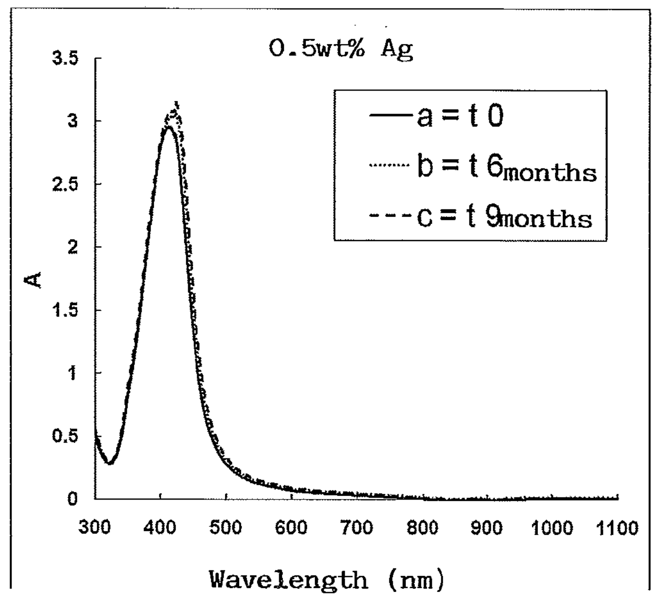
Fig 1 – Defined and intense plasmon absorption band of the sample at 0.5wt% Ag (a), remaining unvaried over time (b-c).
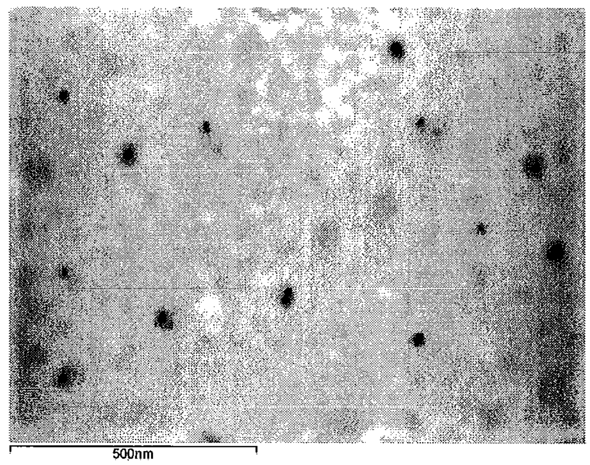
Fig 2 – STEM images of the sample at 0.5wt% Ag.

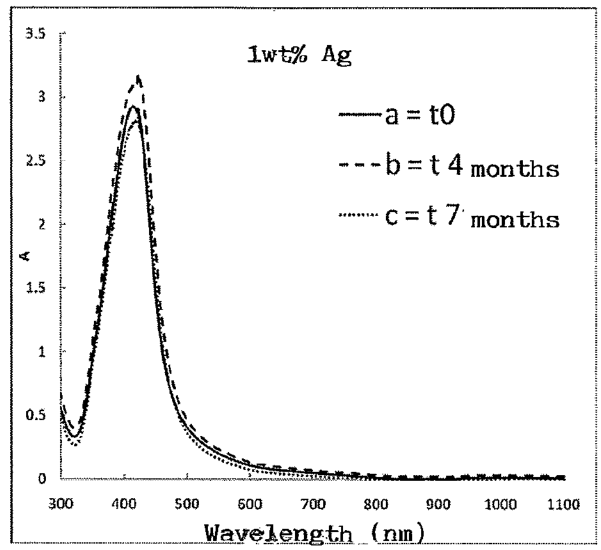
Fig 3 – Defined and intense plasmon absorption band of the sample at 1wt% Ag (a), remaining unvaried over time (b-c).
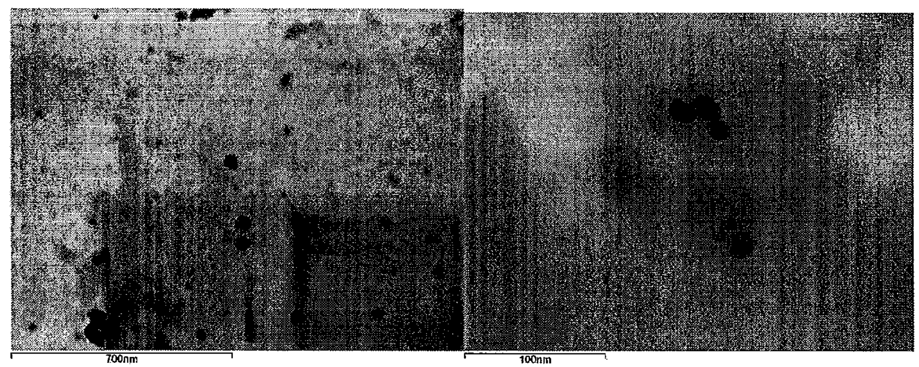
Fig 4 – STEM images of the sample at 1wt% Ag.

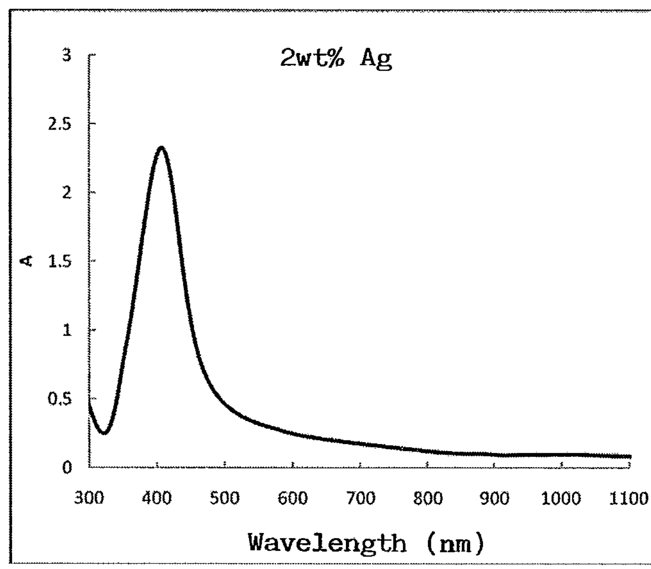
Fig 5 – UV-Vis spectrum of the sample at 2wt% silver.
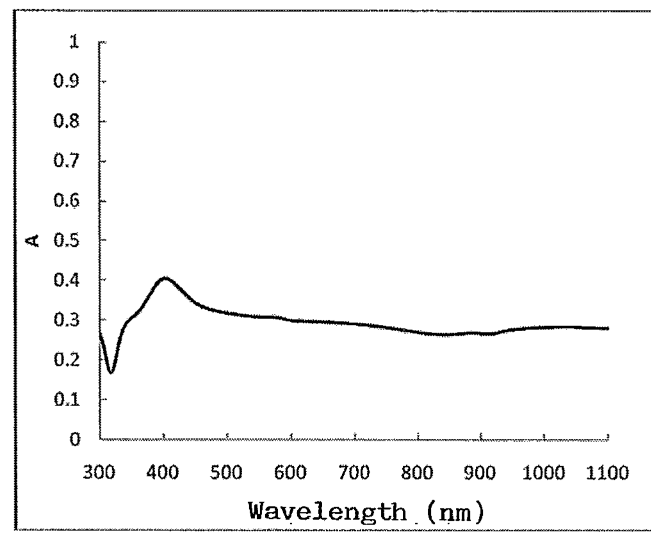
Fig 6 – UV-Vis absorption spectrum of a non-optimized Ag sample.

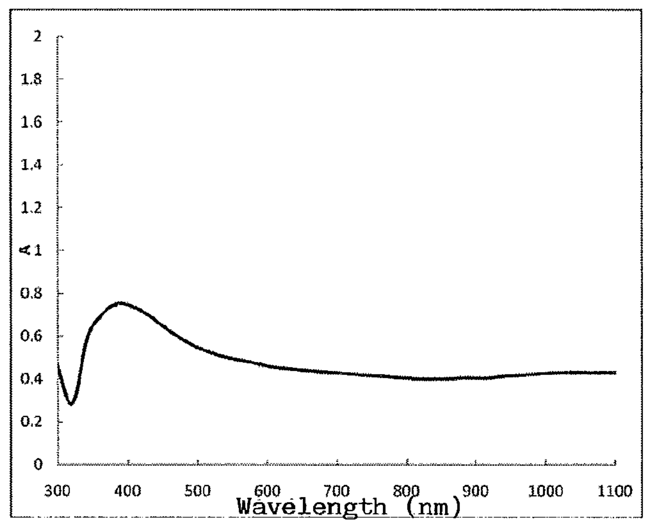
Fig 7 – UV-Vis absorption spectrum of a non-optimized Ag sample.
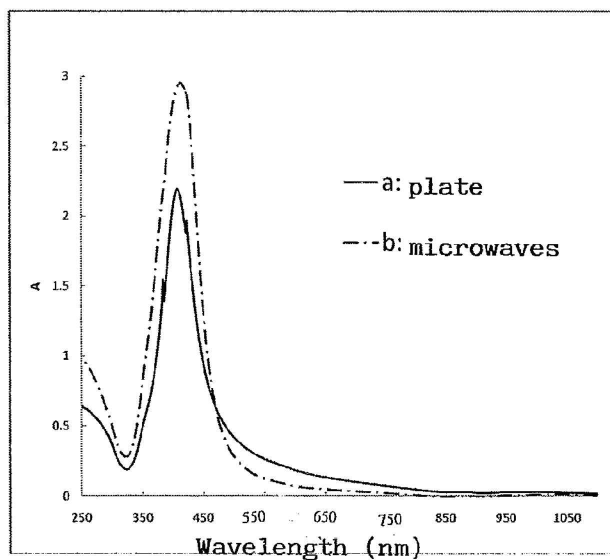
Fig 8 – Plasmon absorption bands of the sample at 0.5wt% Ag synthesized with traditional heating (a), and with microwaves (b).

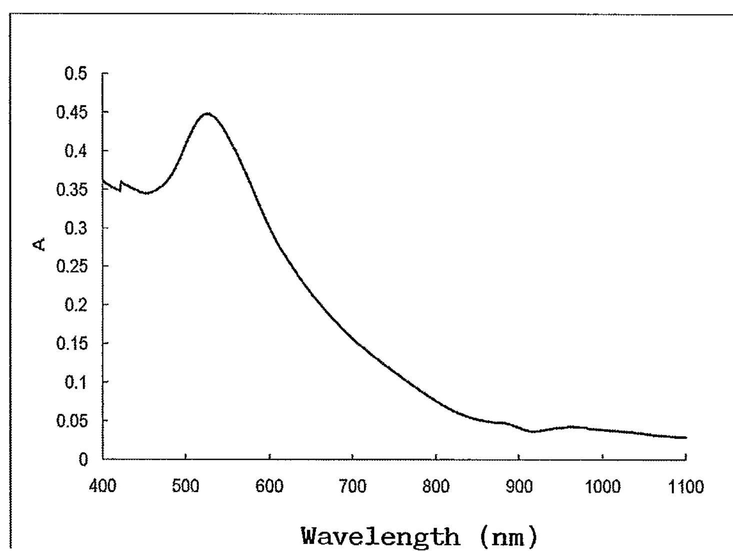
Fig 9 – Plasmon absorption band of the sample at 0.2wt% Au.

PROCESS FOR PREPARING STABLE SUSPENSIONS OF METAL NANOPARTICLES AND THE STABLE COLLOIDAL SUSPENSIONS OBTAINED THEREBY

FIELD OF THE INVENTION

The present invention relates to the field of suspensions of nanometer-sized metal particles and to their preparation methods.

STATE OF THE ART

Because of their versatility and the numerous areas where they find application, metal nanoparticle suspensions are of great interest for industry.

In particular, by virtue of their physicochemical characteristics, metal nanoparticles have important applications in various fields: biomedical, optical and electronic devices, and catalysts.

In the medico-biological sector, said nanoparticles are widely studied for their antibacterial and antifungal properties, the antibacterial effect reported to increase with increasing concentration of metal in the suspension and for sizes less than 50 nm.

The antimicrobial effect of silver can be utilized on various types of materials: prostheses (e.g. silver-loaded hydroxyapatite), plastic sanitary materials, epidermis, materials for dental use, steel, ceramic tiles, textiles and also for water treatment. From the literature it transpires that there is a need for suspensions that are time stable, obtained from reagents with low environmental impact.

Recently, nanoparticulate silver has been investigated for applications in a more specific biomedical field; for example, interactions between nanoparticulate silver and viruses such as HIV have been observed, demonstrating its ability to inhibit them. Furthermore, other studies report the ability of nano-metal to destroy tumour cells.

Other applications that exploit the optical properties typical of nanometric silver and other noble metals, characterized by the phenomenon of surface plasmon resonance, are surface Raman spectroscopy, optical devices and sensors, diagnostic medicine and biological imaging.

Silver nanoparticles are also investigated for their catalytic properties, which are particularly important if they are synthesized together with other metals or oxides (supported catalysts).

The optical and biological properties of silver nanoparticles, and the possibility of transferring the synthesis technique to industry, mainly depend on characteristics such as: high concentration, stability of the suspensions in time and dimension control. The methods proposed in the literature cannot provide for all these requirements together.

Indeed, faced with the innumerable applications for nanoparticulate silver, many synthesis methods are reported in the state of the art which are often able to control both particle shape and size.

In the many published studies, however, it is noted that for colloidal systems the considered concentrations are in most cases very low, and usually between 0.001 and 0.005 M even if the concentration is defined as high.

Cases are reported with 0.05-0.06 M concentrations and a maximum of 0.2 M, but they involve syntheses consisting of precipitation of the solid or the presence of a stabilizing polymer in such excess as to form a metallopolymer composite. Also, the stability over time of the synthesized systems is rarely referred to, with, in one case, a maximum stability of 24 hours being reported for a 0.2 M concentration.

The use of low concentrations enables smaller and more stable particles to be obtained, but for the purpose of industrial use and scale-up it is important to be able to work with medium-high concentrations in order to make the production cycles economically advantageous, by synthesizing a concentrated system which can be diluted in subsequent stages if necessary.

Furthermore, a higher concentration enables the chromic characteristics of silver to be exploited and its antibacterial and antifungal properties to be enhanced, given that it allows more concentrated suspensions to be applied to the surfaces to be treated.

The optimization of a synthesis carried out at low concentration is difficult to repeat at a higher concentration without stability and aggregation problems arising, and for this reason it should be emphasized that the difficulty posed by transferring to industry lies with synthesizing time stable colloidal systems with controlled dimensions and at high concentration.

The colloidal suspensions reported in the literature are obtained either directly by the synthesis process, or by a first step of synthesis and precipitation of the nano-powder followed by redispersion in a solvent in the presence of additives [P K Khanna et al Mater. Lett. 61 (2007) 3366]; in this regard it should however be noted that the nanoparticles are preferably obtained in suspension right after synthesis in order to improve system stability in time and to facilitate scale-up and to avoid the step of powder recovery, washing and redispersion.

Another important aspect for the purposes of transfer to industry is certainly the low environmental impact and versatility of the synthesis. For this reason, most of the syntheses reported in several studies are excluded, such as microemulsion, hydrothermal methods, synthesis in polymer matrices, in supercritical fluids, in toxic organic solvents, with the aid of difficult-to-handle reducing agents (formaldehyde, hydrides) or by radiolytic methods.

In the same manner, chelating agents added to the known preparations are often polymeric organic compounds (PVP, PVA, PAN, starch) or poorly soluble surfactants (CTAB, SDS, TOAB) with physicochemical characteristics often poorly compatible with the required applications and are also often used in excess amounts relative to the metal.

It must also be emphasized that on an industrial scale, solubilization of the polymers requires much time.

In nanoparticle synthesis generally, chelating agents are used because they can be absorbed onto the particle surface, to limit their growth during the reaction and to limit the coagulation phenomenon due to the steric effect, thus conferring stability to the suspension.

Described in the literature are a minority of syntheses which may be transferred to the industrial scale, undertaken in water, in polyols or microwave-assisted polyols, in high-boiling polyalcohols, even using "green" reductants and stabilizers [see for example A. Panaeck et al, J. Phys. Chem. B 110 (2006) 16248; M. Tsuji et al. Coll. Surf. A 293 (2007) 185. C. Y. Tai et al. AIChE Journ. 54 (2008) 445, X. Qiao et al. Coll. Surf. A 256 (2005) 111] but, as already highlighted, these often involve syntheses which comprise precipitation of and possibly redispersion of the solid and in any event present lower concentrations.

SUMMARY OF THE INVENTION

Described are processes for preparing stable suspensions of metal nanoparticles, operating in an aqueous environment at low temperature and at ambient pressure and atmosphere with heating using a microwave apparatus, as are also described the stable nanoparticle suspensions obtained thereby.

BRIEF DESCRIPTION OF THE FIGURES

FIG. 1: shows the defined and intense plasmon absorption band of a suspension according to the invention at 0.5 wt % Ag (a) and its invariance over time (b-c).

FIG. 2: shows STEM images of the suspension of FIG. 1.

FIG. 3: shows the defined and intense plasmon absorption band of a suspension according to the invention at 1 wt % Ag (a) and its invariance over time (b-c).

FIG. 4: shows STEM images of the suspension according to FIG. 3.

FIG. 5: shows the UV-Vis spectrum of a suspension according to the invention at 2 wt % silver.

FIG. 6: shows, for comparison, the UV-Vis absorption spectrum of a non-optimized Ag suspension.

FIG. 7: shows, for comparison, the UV-Vis absorption spectrum of a non-optimized Ag suspension.

FIG. 8: shows, for comparison, the plasmon absorption bands of a suspension at 0.5 wt % Ag synthesized with traditional heating (a) and with microwaves (b).

FIG. 9: shows the plasmon absorption bands of a suspension according to the invention at 0.2 wt % Au.

DETAILED DESCRIPTION OF THE INVENTION

The present invention enables the problems to be overcome by a microwave-assisted synthesis of metal nanoparticles, undertaken in an aqueous atmosphere at low temperature and at ambient pressure and atmosphere.

The developed synthesis consists of adding a precursor salt of the metal to the reaction environment already heated to reaction temperature and containing a reducing agent, a chelating agent and a catalyst with well-defined chelating agent/metal, reductant/metal, catalyst/metal molar ratios.

The term "precursor salts" means nitrates, sulphates, chlorides, acetates, and preferably nitrates for silver and chlorides for gold.

The term "metal nanoparticles" means Au, Ag, Cu, Pd, Pt, Fe particles having dimensions between 1 and 250 nm, preferably between 1 and 100 nm; in particular the invention relates to nanometric suspensions of Ag and Au.

According to the invention the reaction temperature is normally between 25 and 90° C., in particular 70° C. for silver suspensions and 90° C. for gold suspensions.

The term "reducing agents" according to the invention means glucose, galactose, maltose, lactose, saccharose, glucose preferably being used.

As catalysts the following can be used: alkali metal hydroxides, carbonates, ammonia or urea, preferably alkali metal hydroxides (such as NaOH), the final pH being slightly acid and preferably comprised between 5 and 5.5 for silver, but highly basic for gold at about 11-12.

The term "chelating agents" means for example polyvinyl alcohol PVA, polyvinyl pyrrolidone PVP, sodium lauryl sulphate SDS, sodium dodecyl benzene sulphonate SDBD, cetyltrimethyl ammonium bromide CTAB, tetraoctyl ammonium bromide TOAB, TRITON X-100, polyethylene glycol PEG, ethylene diamine tetraacetic acid EDTA, starch, β-cyclodextrin β-CD, preferred chelating agents being polyvinyl pyrrolidone and starch.

The chelating agent/metal ratio is normally comprised between 1 and 10, being preferably 5.5 for silver and 2.8-3 for gold.

The reducing agent/metal ratio is normally comprised between 1 and 5, being preferably 1 for silver and 2 for gold.

The catalyst/metal ratio is normally comprised between 1 and 10, being preferably 1.4 for silver and 7.9 for gold.

The process presents several aspects that make it easily transferable to the industrial scale: ease of application, low cost of raw materials, low environmental impact, speed of synthesis, versatility, obtainment of suspensions that are time stable and highly concentrated (concentration exceeding 0.5 M i.e. above 5 wt % solids).

By using eco- and biocompatible reagents such as water (solvent), glucose (reductant), polyvinyl pyrrolidone or starch (chelating agents), the reaction can be included within the category of "green chemistry".

The synthesis enables colloidal suspensions to be obtained which are of high concentration and stable in time (for periods longer than 7 months). The thus obtained suspensions have average dimensions, measured by the DSL technique, of around 20-30 nm and exhibit a monodisperse distribution up to concentrations of 0.03-0.05 M (3-5% by weight), while for higher concentrations bimodal distributions are noted with the presence of a principle particle population of 5-10 nm in size.

The versatility of the process enables particle size and stability in time of the suspensions to be accurately controlled, even at a high metal concentration, by simply changing some synthesis parameters such as catalyst concentration and reductant concentration.

The optical properties are excellent, in which respect an intense absorption band positioned at 400-415 nm is noted due to the phenomenon of surface plasmon resonance, typical of nanoparticulate silver. The high intensity of the band is an indication of the high reaction yield and the nanometric sizes of the particles.

During the presently considered ageing time of 9 months, there were no appreciable variations in either the optical properties or the average sizes, this being indicative of suspension stability and the fact that no precipitation phenomena were verified.

The microwave reactor employed is equipped with an on-line device for controlling temperature and applying a continuous or pulsed power. Microwave use is fundamental for ensuring homogeneity and uniformity of heating throughout the volume and obtaining suspensions with better stability in time and smaller particle size. The presence of temperature dishomogeneity in the solvent volume, often found with traditional heating, gives rise to suspensions with larger sizes and reduced stability in time. In addition, this type of heating facilitates scale-up of continuous processes.

The very short reaction times, of about 5 minutes, have facilitated the transfer to industry which has already been successfully undertaken in the form of preliminary tests in a microwave system able to operate in continuous flow. In this system the scale-up problems are limited and, because of the continuous flow, small volumes can be processed each time thus avoiding the common problems of microwave penetration into large volumes of liquid, typical of industrial batch reactors (non-continuous).

Compared to the known state of the art, the process of the invention hence encompasses:

a) The use of microwave heating in the aqueous synthesis of metal nanoparticles in the presence of glucose and NaOH.

b) Obtaining only metal nanoparticles in monodisperse suspension, comprised between 10 and 100 nm in size depending on the concentration used, and of excellent optical quality.
c) Obtaining stable colloidal suspensions (without precipitation phenomena) at high concentration (0.5 M equal to 5 wt %), this being much higher than the maximum concentrations reported in the literature for colloidal suspensions of the same type.
d) Synthesis having zero environmental impact, due to the use of totally "green" reagents: water, glucose, PVP or starch, silver nitrate
e) Excellent time stability of the suspensions, i.e. for periods longer than 9 months, is in the sense of maintaining unchanged the optical properties (UV-VIS absorption band) and dimensional properties (verified with DLS technique and SEM-STEM-TEM)
f) Easy transfer to industry by virtue of the characteristics of process simplicity, the "green" nature of the reagents and the low cost of raw materials. Transferring to industry is also facilitated by the long-time stability of the suspensions and by the attainable high concentration, optimum dimensions being likewise ensured.

Example 1

Preparation of a Suspension of 0.5 wt % Ag Nanoparticles 2.76 g of PVP k25 (Mwa=29000) are dissolved in 70 ml of water. Separately, two solutions are prepared: one of 0.26 M $AgNO_3$ (0.75 g of salt in 17 ml of water) and one of 1.11 M d(+)glucose (0.80 g of glucose in 4 ml of water).

The glucose solution and 0.25 g of NaOH are added to the PVP solution, followed by heating with microwaves to 70° C., setting the power to a maximum of 200 W. When the system reaches 70° C. the aqueous $AgNO_3$ solution is injected and the reaction is allowed to proceed for 3 minutes. The molar ratios used are the following: $nPVP/nAgNO_3=5.5$; $nNaOH/nAgNO_3=1.4$; $nGlucose/nAgNO_3=1$.

On addition of $AgNO_3$ the solution immediately turns brown in colour with intense yellow reflections. A precipitate is not noted.

The concentration by weight of Ag° is 0.5 wt % equal to a 0.05 M $AgNO_3$ concentration.

The UV-VIS absorption band is very narrow and presents only one maximum at 412 nm, there being no other bands (FIG. 1 (curve (a)).

The stability in time of the suspension prepared in this manner is at least 9 months. Within 9 months no significant changes are noted either in optical properties (UV-VIS, FIG. 1 (curves (b) and (c)) or in particle size (DLS), indicative of the fact that the number and dimensions of the particles in suspension do not change over time. The STEM and DLS analyses confirm the presence of particles with an average diameter of around 30 nm and low polydispersion (PDI=0.20).

Example 2

Preparation of a Suspension of 1 wt % Ag Nanoparticles 5.52 g of PVP k25 (Mwa=29000) are dissolved in 65 ml of water. Separately, two solutions are prepared: one of 0.52 M $AgNO_3$ (1.50 g of salt dissolved in 17 ml of water) and one of 2.2 M d(+)glucose (1.59 g of glucose in 4 ml of water).

The glucose solution and 0.49 g of NaOH are added to the PVP solution, followed by microwave heating to 70° C., setting the power to a maximum of 200 W. When the system reaches 70° C. the aqueous $AgNO_3$ solution is injected and the reaction is allowed to proceed for 3 minutes. The molar ratios used are the following: $nPVP/nAgNO_3=5.5$; $nNaOH/nAgNO_3=1.4$; $nGlucose/nAgNO_3=1$.

On addition of $AgNO_3$ the solution immediately turns dark brown in colour with intense yellow reflections. A precipitate is not noted.

The concentration by weight of Ag° is 1 wt % equal to a 0.1M $AgNO_3$ concentration.

The UV-VIS absorption band is very narrow and presents only one maximum at 414 nm, there being no other bands (FIG. 3*a*).

The stability in time of the thus prepared suspension is at least 9 months.

As the suspension ages, no significant changes are noted either in optical properties (UV-VIS, FIG. 3*b-c*) or in particle size (DLS), indicative of the fact that the number and dimensions of the particles in suspension do not change over time.

The STEM (FIG. 4) and DLS analyses confirm the presence of particles with an average diameter of around 35 nm and bimodal distribution (PDI=0.45); indeed, a particle fraction is observed at 10-15 nm with a size greater than 30-50 nm.

Example 3

Preparation of a Suspension of 2 wt % Aq Nanoparticles 11.02 g of PVP k25 (Mwa=29000) are dissolved in 60 ml of water. Separately, two solutions are prepared: one of $AgNO_3$ (2.99 g of salt dissolved in 8 ml of water, 2.2 M) and one of d(+)glucose (3.17 g of glucose in 8 ml of water, 2.2 M).

The glucose solution and 0.99 g of NaOH are added to the PVP solution, followed by microwave heating to 70° C., setting the power to a maximum of 200 W. When the system reaches 70° C. the aqueous $AgNO_3$ solution is injected and the reaction is allowed to proceed for 3 minutes. The molar ratios used are the following: nPVP (in repeating units)/$nAgNO_3=5.5$; $nNaOH/nAgNO_3=1.4$; $nGlucose/nAgNO_3=1$.

On addition of $AgNO_3$ the solution immediately turns very dark brown in colour with dark yellow reflections. A precipitate is not noted.

The concentration by weight of Ag° is 2 wt % equal to a 0.2M $AgNO_3$ concentration.

The UV-VIS absorption band is at 406 nm (FIG. 5). The DLS analyses indicate the presence of particles with average diameter around 45 nm and bimodal distribution with PDI=0.40.

The stability in time of the thus prepared suspension is at least 1 month.

Example 4

Preparation of a Suspension at 2 wt % With Non-Optimized $PVP/AgNO_3$ and $nGlucose/nAgNO_3$ Molar Ratios 3.78 g of PVP k25 (Mwa=29000), 5.35 g of d(+)glucose and 0.83 g of NaOH are dissolved in 60 ml of water. Separately, a solution of $AgNO_3$ is prepared (2.52 g of salt dissolved in 20 ml of water).

The PVP and glucose solution is heated to 60° C., the $AgNO_3$ solution is added and the reaction is allowed to proceed for 10 minutes. The molar ratios used are the following: nPVP (in repeating units)/$nAgNO_3=2.2$; $nNaOH/nAgNO_3=1.4$; $nGlucose/nAgNO_3=2$.

On addition of $AgNO_3$ the solution becomes opalescent, then immediately turns grey-green in colour and a grey precipitate instantly forms.

The concentration by weight of Ag° is 2 wt % equal to a 0.2M $AgNO_3$ concentration.

From the UV-VIS a band positioned at 405 nm is observed with a low intensity and broad in shape (FIG. 6). The reduced intensity is due to the formation of large sized particles which generate a weak plasmon resonance signal; also, no absorbance is given by the precipitated fraction.

Through DLS analysis average sizes of 200 nm emerge with a highly polydisperse distribution (PDI=0.7).

Example 5

Preparation of a Suspension of 1 wt % Ag Nanoparticles With Non-Optimized $nNaOH/nAc^3$ Ratio 5.52 g of PVP k25 (Mwa=29000) are dissolved in 65 ml of water. Separately, two solutions are prepared: one of $AgNO_3$ (1.50 g of salt dissolved in 17 ml of water, 0.52 M) and one of d(+)glucose (1.59 g of glucose in 4 ml of water, 2.2 M).

The glucose solution and 1.41 g of NaOH are added to the PVP solution, followed is by microwave heating to 70° C., setting the power to a maximum of 200 W. When the system reaches 70° C. the aqueous $AgNO_3$ solution is injected and the reaction is allowed to proceed for 3 minutes. The molar ratios used are the following: $nPVP/nAgNO_3$=5.5; nNaOH/$nAgNO_3$=4; nGlucose/$nAgNO_3$=1.

On addition of $AgNO_3$ the solution immediately turns grey-green in colour, displaying a strong opalescence and a precipitate at the base.

The concentration by weight of Ag° is 1 wt % equal to a 0.1M $AgNO_3$ concentration.

The UV-VIS absorption band is broad and not very intense, an indication of the presence of large particles unable to give any surface plasmon resonance phenomena (FIG. 7). The average sizes obtained by DLS are 290 nm with a bimodal distribution and PDI=0.5.

Example 6

Preparation of a Suspension of 0.5 wt % Ag Nanoparticles With Traditional Heating 2.76 g of PVP k25 (Mwa=29000) are dissolved in 70 ml of water. Separately, two solutions are prepared: one of 0.26 M $AgNO_3$ (0.75 g of salt in 17 ml of water) and one of 1.11 M d(+)glucose (0.80 g of glucose in 4 ml of water).

The glucose solution and 0.25 g of NaOH are added to the PVP solution, followed by heating with a plate to 70° C., maintaining the entire system under magnetic agitation. When the system reaches 70° C. the aqueous $AgNO_3$ solution is injected and the reaction is allowed to proceed for 3 minutes. The molar ratios used are the following: nPVP/$nAgNO_3$=5.5; nNaOH/$nAgNO_3$=1.4; nGlucose/$nAgNO_3$=1.

On addition of $AgNO_3$ the solution immediately turns grey-green in colour with a strong opalescence and yellow reflections are not seen.

The concentration by weight of Ag° is 0.5 wt % equal to a 0.05 M $AgNO_3$ concentration.

The suspension is stable for about 10 days, after which the solid precipitates.

The UV-VIS absorption band is narrow and presents a maximum at 410 nm (FIG. 8*a*), however when compared to the band obtained with the same sample but synthesized using microwaves (FIG. 8*b*), a lower intensity is seen, this phenomenon being due to the presence of fewer particles giving the plasmon resonance phenomenon.

DLS analyses show particles with average diameter of around 60 nm and an increased polydispersion compared to the corresponding sample synthesized by using microwaves (PDI=0.3).

Example 7

Preparation of a Suspension of 0.2 wt % Au Nanoparticles 2.35 g of PVP k25 (Mwa=29000) are dissolved in 100 ml of water. To this solution are added 0.40 g of glucose and 0.35 g of NaOH, followed by microwave heating to 90° C., setting the power to a maximum of 350 W.

When the system reaches 90° C., 0.72 g of an aqueous $HAuCl_4$ solution at 30 wt % Au is injected and the reaction is allowed to proceed for 5 minutes. The molar ratios used are the following: $nPVP/nAgNO_3$=2.8; nNaOH/$nAgNO_3$=7.9; nGlucose/$nAgNO_3$=2.

On addition of the precursor the solution immediately turns reddish-purple in colour. A precipitate is not noted.

The concentration by weight of Au° is 0.2 wt % equal to a 0.01M $HAuCl_4$ concentration.

The UV-VIS absorption band is typical for nanometric gold, and is positioned at 525 nm (FIG. 9). The DLS analyses of the particles show an average diameter of around 15 nm and PDI=0.3.

What is claimed is:

1. A process for the continuous preparation of stable suspensions of metal nanoparticles selected from the group consisting of Au, Ag, Cu, Pd, Pt and Fe, the process comprising:

first, forming a combination reducing agent, chelating agent and catalyst in water;

second, heating the combination in a microwave oven to a desired reaction temperature to obtain a heated combination;

third, injecting, after the heated combination reaches the desired reaction temperature, a precursor salt of a metal selected from the group consisting of Au, Ag, Cu, Pd, Pt and Fe into the heated combination; and fourth, reacting the combination of precursor salt and heated combination for a time sufficient to obtain a stable suspension of metal nanoparticles, the nanoparticles having a diameter of from 1 to 250 nm, wherein the suspension is optically and dimensionally stable.

2. The process according to claim 1, wherein said nanoparticles are Ag or Au particles having an average diameter of from 1 to 100 nm.

3. The process according to claim 2, wherein the temperature for reacting the precursor salt and heated combination is 70° C. to obtain Ag suspensions and the temperature for reacting the precursor salt and heated combination is 90° C. to obtain Au suspensions.

4. The process according to claim 3, wherein the reducing agent is selected from the group consisting of glucose, galactose, maltose, lactose, saccharose and any combinations of the foregoing.

5. The process according to claim 4, wherein the catalyst is selected from the group consisting of alkali metal hydroxides, carbonates, ammonia, urea and any combinations of the foregoing.

6. The process according to claim 4, wherein the chelating agent is selected from the group consisting of polyvinyl alcohol PVA, polyvinyl pyrrolidone PVP, sodium lauryl sulphate SDS, sodium dodecyl benzene sulphonate SDBS, cetyltrimethyl ammonium bromide CTAB, tetraoctyl ammonium bromide TOAB, p-(1, 1, 3, 3-tetramethylbutyl)-phenyl ether, polyethylene glycol PEG, ethylene diamine tetraacetic acid EDTA, starch, β-cyclodextrin β-CD and any combinations of the foregoing.

7. The process according to claim 6, wherein the chelating agent/metal molar ratio is from 1:1 to 10:1.

8. The process according to claim 7, wherein the chelating agent/metal molar ratio is 5.5:1 for silver and 2.8-3:1 for gold.

9. The process according to claim 8, wherein the reducing agent/metal molar ratio is 1:1 for silver and 2:1 for gold.

10. The process according to claim 9, wherein the catalyst/metal molar ratio is 1.4:1 for silver and 7.9:1 for gold.

11. The process according to claim 1, wherein the reaction temperature is from 25° C. to 90° C.

12. The process according to claim 1, wherein the suspension is optically and dimensionally stable for at least seven (7) months.

13. The process according to claim 1, wherein the suspension is optically and dimensionally stable for at least nine (9) months.

14. A suspension comprising:

a combination reducing agent, chelating agent and catalyst and from 0.5% to 2.0% Ag metal nanoparticles having an average diameter of from 30 to 45 nm, a polydispersion index (PDI) of from 0.20 to 0.45, a single UV-VIS absorption at from 400 to 415 nm, and an optical and dimensional stability of at least one (1) month, wherein the chelating agent comprises PVP, and wherein the molar ratio of PVP to Ag metal nanoparticles is 5.5.

15. The suspension according to claim 14, wherein the suspension is optically and dimensionally stable for at least seven (7) months.

16. The suspension according to claim 14, wherein the suspension is optically and dimensionally stable for at least nine (9) months.

* * * * *